US011522410B2

(12) United States Patent
Takakuwa et al.

(10) Patent No.: US 11,522,410 B2
(45) Date of Patent: Dec. 6, 2022

(54) MOLDED STRUCTURE OF BRUSHLESS FAN MOTOR AND METHOD FOR MOLDING BRUSHLESS FAN MOTOR

(71) Applicant: SANYO DENKI CO., LTD., Tokyo (JP)

(72) Inventors: Munenori Takakuwa, Tokyo (JP); Kakuhiko Hata, Tokyo (JP); Yukihiro Nagatsuka, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 334 days.

(21) Appl. No.: 16/819,756

(22) Filed: Mar. 16, 2020

(65) Prior Publication Data
US 2020/0303990 A1 Sep. 24, 2020

(30) Foreign Application Priority Data
Mar. 19, 2019 (JP) .............................. JP2019-051117

(51) Int. Cl.
*H02K 7/14* (2006.01)
*F04D 25/06* (2006.01)
*H02K 15/12* (2006.01)

(52) U.S. Cl.
CPC ........... *H02K 7/14* (2013.01); *F04D 25/0646* (2013.01); *F04D 25/0693* (2013.01); *H02K 15/12* (2013.01); *H02K 2203/03* (2013.01)

(58) Field of Classification Search
CPC ...... H02K 7/14; H02K 15/12; H02K 2203/03; H02K 1/187; H02K 21/22; H02K 2211/03;
(Continued)

(56) References Cited

U.S. PATENT DOCUMENTS 5,227,686 A 7/1993 Ogawa
6,359,354 B1 * 3/2002 Watanabe ........... F04D 25/0693
310/43

(Continued)

FOREIGN PATENT DOCUMENTS

CN 101902090 A 12/2010
EP 2793370 A2 10/2014
(Continued)

OTHER PUBLICATIONS

Extended European Search Report (EESR) dated Aug. 25, 2020 for the corresponding European Patent Application No. 20164035.6.

*Primary Examiner* — John K Kim
(74) *Attorney, Agent, or Firm* — Rankin, Hill & Clark LLP

(57) ABSTRACT

In this molded structure of the brushless fan motor, at least a part of a circuit board is supported by a notch portion in a distal end portion of a projecting end formed on a board storage portion side and a rotary shaft side of an insulator, the board storage portion and the insulator are placed in such a manner as to surround a periphery of a bearing support tube portion, a part of a molded portion is disposed between the bearing support tube portion and the insulator and between the board storage portion and the insulator, and the entire circuit board located inside a storage chamber, excluding the portion supported by the projecting end formed on the board storage portion side of the insulator, is covered with the part of the molded portion.

12 Claims, 4 Drawing Sheets

(58) Field of Classification Search
CPC ............ H02K 3/522; H02K 5/08; H02K 5/10;
H02K 11/33; H02K 15/14; H02K 1/04;
H02K 1/16; H02K 1/274; H02K 3/345;
H02K 5/16; H02K 29/00; F04D 25/0646;
F04D 25/0693; B29C 45/14336; B29K
2705/12
USPC .......................................................... 310/43
See application file for complete search history.

(56) References Cited

U.S. PATENT DOCUMENTS

| | | | |
|---|---|---|---|
| 9,748,814 B2 * | 8/2017 | Ishihara | ................. H02K 11/33 |
| 10,465,692 B2 | 11/2019 | Kudo et al. | |
| 2008/0029506 A1 * | 2/2008 | Neal | ...................... H05B 6/108 |
| | | | 219/628 |
| 2008/0252163 A1 * | 10/2008 | Yang | ...................... H02K 5/163 |
| | | | 310/91 |
| 2011/0081258 A1 * | 4/2011 | Yoshida | ................. H02K 3/522 |
| | | | 310/71 |
| 2012/0139387 A1 | 6/2012 | Hung et al. | |
| 2013/0039783 A1 * | 2/2013 | Wagner | ................. F04D 29/263 |
| | | | 417/313 |
| 2014/0169969 A1 * | 6/2014 | Takakuwa | ............. F04D 25/068 |
| | | | 416/170 R |
| 2014/0314596 A1 | 10/2014 | Kudo et al. | |
| 2014/0354117 A1 * | 12/2014 | Ishihara | ................... H02K 7/14 |
| | | | 310/67 R |
| 2015/0093271 A1 * | 4/2015 | Hiromoto | ............... F04D 25/06 |
| | | | 310/156.43 |
| 2015/0167678 A1 * | 6/2015 | Yamazaki | ............. F04D 29/403 |
| | | | 415/183 |
| 2018/0252223 A1 * | 9/2018 | Yamasaki | ........... F04D 25/0613 |
| 2020/0303990 A1 * | 9/2020 | Takakuwa | ............. H02K 1/187 |

FOREIGN PATENT DOCUMENTS

| | | |
|---|---|---|
| EP | 2793370 A3 | 9/2016 |
| JP | 2001-128408 A | 5/2001 |
| JP | 3730461 B2 | 1/2006 |

\* cited by examiner

MOLDED STRUCTURE OF BRUSHLESS FAN MOTOR AND METHOD FOR MOLDING BRUSHLESS FAN MOTOR

CROSS-REFERENCE TO RELATED APPLICATION

This application claims priority from Japanese Patent Application No. 2019-051117 filed with the Japan Patent Office on Mar. 19, 2019, the entire content of which is hereby incorporated by reference.

BACKGROUND

1. Technical Field

One aspect of the present disclosure relates to a molded structure of a brushless fan motor and a method for molding the brushless fan motor.

2. Related Art

Some known brushless fan motors have the following structure: in this structure, a lead storage groove in a web that houses a stator and a lead in a stator-side case is molded with silicone rubber; consequently, the stator side has a waterproof structure. It was found that if such known brushless fan motors are used under an environment exposed to water containing oil mist for an extended period of time, the insulation of the molded portion is deteriorated, and it becomes hard for a rotor to rotate. Hence, a structure illustrated in FIG. 4 is used. In this structure, a resin material such as epoxy resin is molded in a state where a stator, a circuit board including an electronic component, and a plurality of leads are housed in a stator-side case (refer to, for example, Japanese Patent No. 3730461).

In such a publicly known molded structure, epoxy resin has high resistance to water or oil (including a water mist, an oil mist, or an emulsion of water and oil; hereinafter the same). Hence, even if a component molded with epoxy resin is exposed to water or oil for a long period of time, the possibilities of swelling and a reduction in insulation are low. Moreover, the possibility that the size of a gap between the rotor and the stator is reduced due to the swelling of the molded portion to inhibit the rotation of the rotor is reduced.

Especially, selecting a specific resin material having a certain hardness (for example, an epoxy resin of which hardness after curing is between 30 and 90 Shore D) is advantageous in the following point: in other words, it is possible to maintain the molding accuracy and mechanical strength of the molded portion and also reduce stress that is applied to the electronic component and the circuit board, which are placed inside the molded portion. Therefore, an effective waterproof and oilproof structure can be obtained.

SUMMARY

A molded structure of a brushless fan motor includes: a stator including a plurality of stator poles configured by winding a slot winding around a salient pole portion of a core configured by laminating a plurality of steel sheets, the core including a plurality of the salient pole portions, using a slot of an insulator placed around the core; a circuit board fixed to the stator, in which an electronic component configuring a control circuit for controlling current flowing through the windings configuring the plurality of stator poles is mounted; a rotor including a plurality of rotor poles including a permanent magnet on an inner peripheral side, and a plurality of blades on an outer peripheral side; a stator-side case including, a bearing support tube portion housing a bearing for rotatably supporting a rotary shaft of the rotor, a housing portion surrounding an outer periphery of the blades of the rotor, a board storage portion configured to form a storage chamber of the circuit board by covering an inner and an outer peripheral side of the circuit board excluding a portion on the rotor side and a side opposite to the rotor, and a plurality of webs coupling the board storage portion and the housing portion; and a molded portion in which at least the stator and the circuit board including the electronic component are molded with an insulation material. At least a part of the circuit board is supported by a notch in a distal end portion of a projecting end formed on the board storage portion side and the rotary shaft side of the insulator, the board storage portion and the insulator are placed in such a manner as to surround a periphery of the bearing support tube portion, a part of the molded portion is disposed between the bearing support tube portion and the insulator and between the board storage portion and the insulator, and the entire circuit board located inside the storage chamber, excluding the portion supported by the projecting end formed on the board storage portion side of the insulator, is covered with the part of the molded portion.

DETAILED DESCRIPTION

Figure 1:
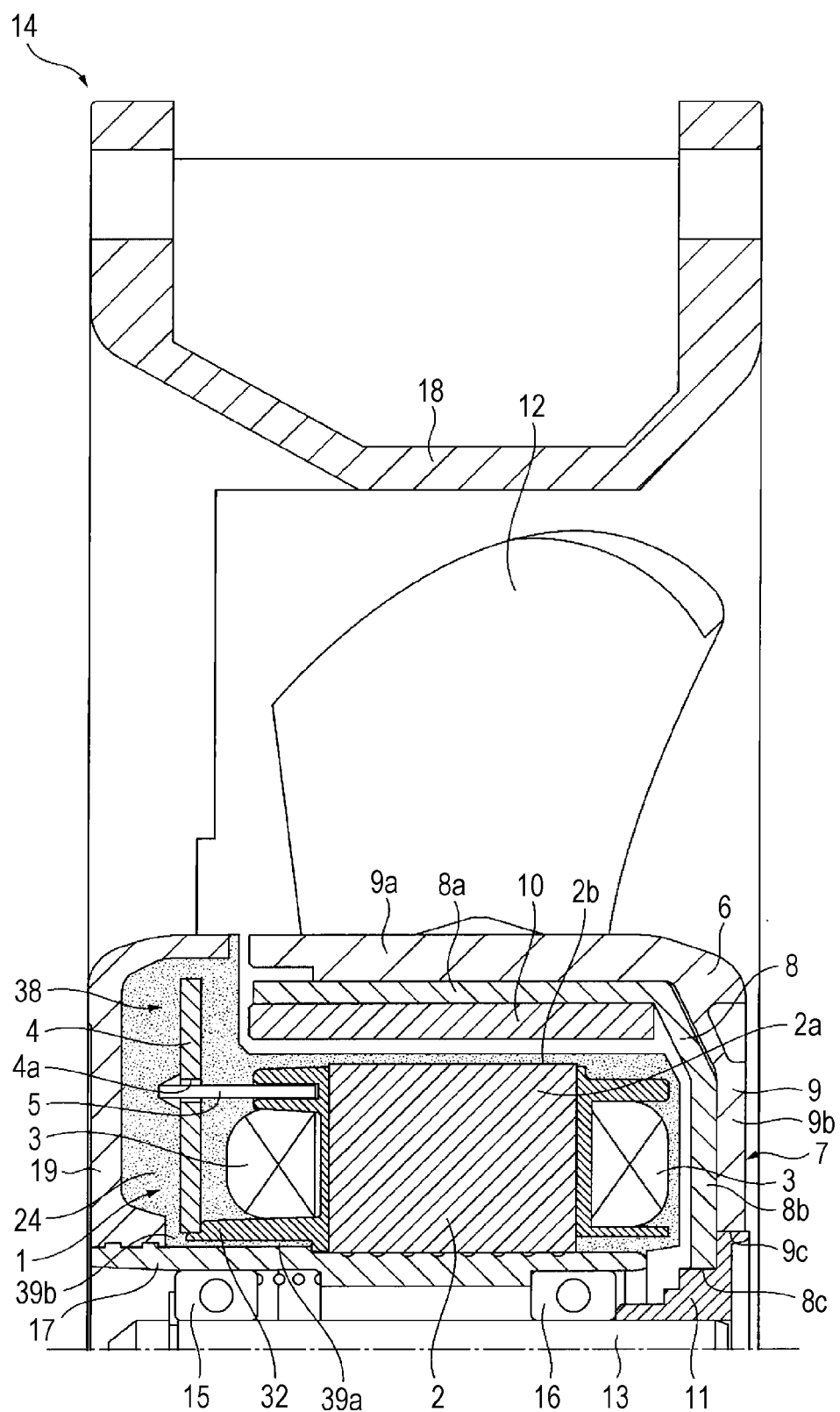
FIG. 1 is a half cross-sectional view of a brushless fan motor according to one embodiment of the present disclosure as viewed from a plane parallel to a rotary shaft, the plane passing the center of the rotary shaft.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 4:
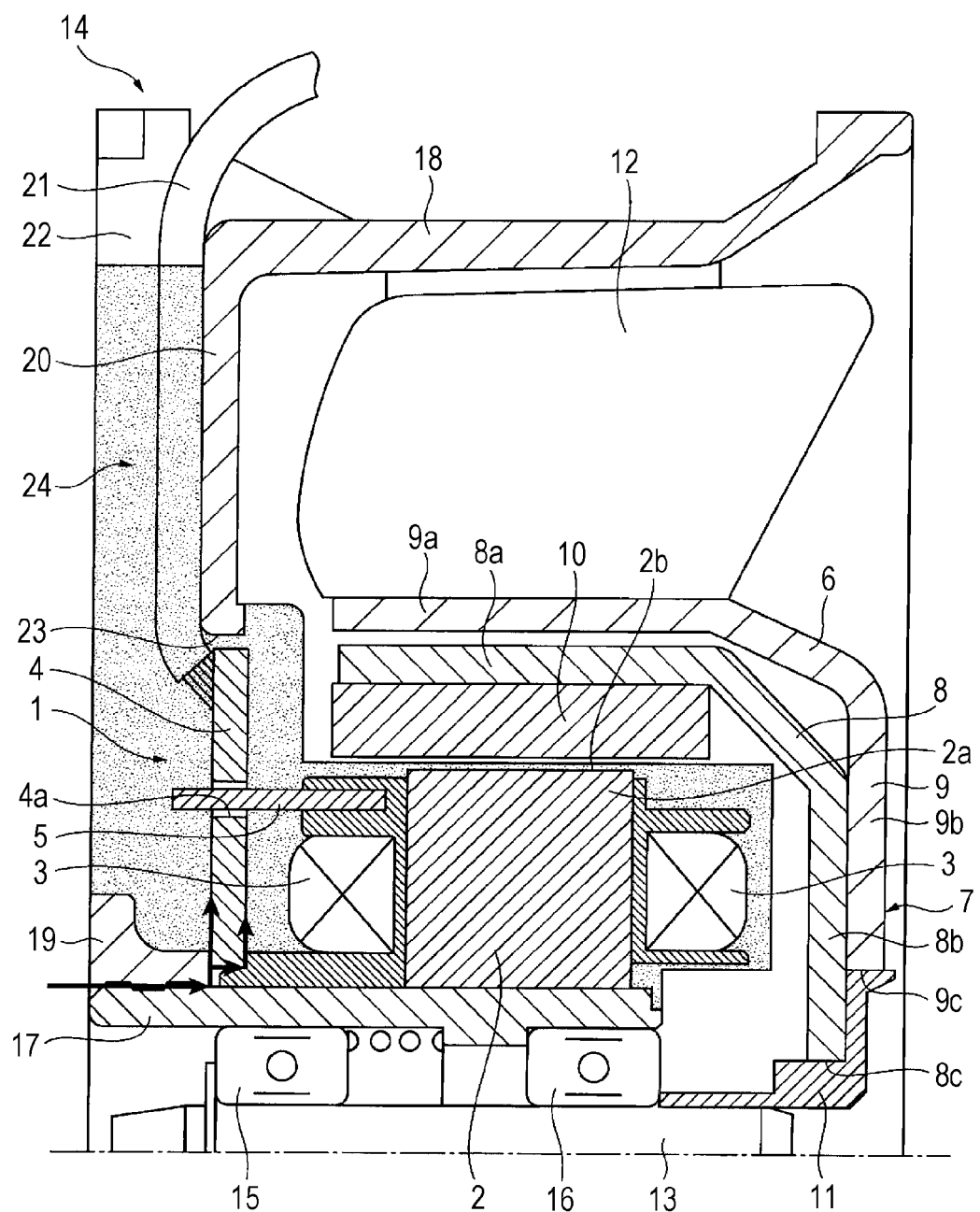
FIG. 4 is a half cross-sectional view of a brushless fan motor according to a known example, and illustrates the structure of the brushless fan motor and also indicates a route of entry of, for example, water or oil by arrows.

It had conventionally been understood that defects caused by corrosion, erosion, and other electrical breakdown of a circuit board and the like due to water or oil could be prevented by employing the molded structure illustrated in FIG. 4. However, the present inventors have found that there is the possibility that the following findings occur. Even if the above-mentioned molded structure is employed, there is still an interface between materials different from each other, for example, a metal material and a resin material, in a part of the molded structure. A minute gap formed at the interface allows water or oil to be absorbed and enter from outside through capillary action. The water or oil forms a route that reaches the circuit board embedded in the molded structure. The water or oil that has entered through the route reaches the circuit board. Consequently, defects caused by corrosion, erosion, and other electrical breakdown of the circuit board occur.

In other words, in the example illustrated in FIG. 4, a circuit board 4 takes waterproof and oilproof measures through a molded portion including a thermosetting resin. An outer peripheral surface of a bearing support tube portion 17 that supports bearings 15 and 16 of a rotary shaft 13 is tightly enclosed by a stator core 2, an insulator (no reference numeral assigned) around which a stator winding 3 is wound, and a board storage portion (frame) 19 including a thermosetting resin. An edge of the circuit board 4 on the rotary shaft 13 side is fitted in a notch in a distal end portion of a projecting end of the insulator. The edge of the circuit board 4 on the rotary shaft 13 side is held by the board storage portion (frame) 19 at a step portion formed by the notch.

In this structure, the board storage portion (frame) 19 and the bearing support tube portion 17 include materials different from each other. Hence, as indicated by arrows in FIG. 4, water or oil is absorbed and enter from an external environment (the air) through capillary action occurring in a minute gap (interface) between the board storage portion (frame) 19 and the bearing support tube portion 17. The water or oil that has entered in such a manner reaches the circuit board 4 through a minute gap (interface) between components similarly including materials different from each other. After a lapse of an extended period of time, defects caused by corrosion, erosion, and other electrical breakdown of the circuit board 4 may occur.

Strictly speaking, a minute gap is also present between components including the same kind of material, except a case where they are integrated by, for example, alloying based on, for example, welding. Hence, in such a case, a similar phenomenon can occur. However, it is conceivable that in the case where components include materials different from each other, such a phenomenon is highly likely to be enhanced due to, for example, a difference in the degree of the thermal coefficient of expansion, a time-varying change, or swelling by water or oil while the brushless fan motor is being used.

One object of the present disclosure is to provide the following molded structure of a brushless fan motor: in this molded structure of the brushless fan motor, it is possible to reduce the influence of the entry of water or oil; furthermore, the molded structure can maintain endurance even after an extended period of use, and has higher waterproofness and oilproofness than before.

Moreover, another object of the present disclosure is to provide a method for molding the above brushless fan motor.

A molded structure of a brushless fan motor according to an aspect of the present disclosure (this molded structure) includes: a stator including a plurality of stator poles configured by winding a slot winding around a salient pole portion of a core configured by laminating a plurality of steel sheets, the core including a plurality of the salient pole portions, using a slot of an insulator placed around the core; a circuit board fixed to the stator, in which an electronic component configuring a control circuit for controlling current flowing through the windings configuring the plurality of stator poles is mounted; a rotor including a plurality of rotor poles including a permanent magnet on an inner peripheral side, and a plurality of blades on an outer peripheral side; a stator-side case including, a bearing support tube portion housing a bearing for rotatably supporting a rotary shaft of the rotor, a housing portion surrounding an outer periphery of the blades of the rotor, a board storage portion configured to form a storage chamber of the circuit board by covering an inner and an outer peripheral side of the circuit board excluding a portion on the rotor side and a side opposite to the rotor, and a plurality of webs coupling the board storage portion and the housing portion; and a molded portion in which at least the stator and the circuit board including the electronic component are molded with an insulation material. At least a part of the circuit board is supported by a notch in a distal end portion of a projecting end formed on the board storage portion side and the rotary shaft side of the insulator, the board storage portion and the insulator are placed in such a manner as to surround a periphery of the bearing support tube portion, a part of the molded portion is disposed between the bearing support tube portion and the insulator and between the board storage portion and the insulator, and the entire circuit board located inside the storage chamber, excluding the portion supported by the projecting end formed on the board storage portion side of the insulator, is covered with the part of the molded portion.

The present molded structure employs the above configuration and, accordingly exerts the following operation and effect in addition to the operation obtained by the known molded structure of the brushless fan motor. In other words, in the present molded structure, the entire circuit board is covered with the part of the molded portion. Hence, even if the entry of a liquid such as water or oil occurs through capillary action at an interface between dissimilar materials such as a metal material and a resin material, which remains in the part of the molded structure, it is hard for the entered water or oil to reach the circuit board.

Further, in the molded structure, a small-diameter portion may be formed on an outer peripheral portion of the bearing support tube portion via a step, a flange portion in contact with the step, the flange portion being fitted on the small-diameter portion, may be formed on an inner peripheral side of the insulator, the flange portion is formed in such a manner that a height of the flange portion with respect to a surface on the inner peripheral side of the insulator is greater than a depth of the step, and the part of the molded portion may be disposed between the bearing support tube portion and the insulator.

Further, in the molded structure, a surface where the step and the flange portion are in contact with each other may be a positioning portion configured to prevent the insulator and the stator from moving toward the board storage portion, or a dam portion configured to prevent passage of a liquid.

In the known technology, the insulator distal end portion and the board storage portion (frame) near the portion supporting the circuit board are brought into contact with each other. Accordingly, the positions of the stator and the insulator are determined in a direction of the axis of rotation. On the other hand, in the present molded structure having the above configuration, the positioning portion in the direction of the axis of rotation can be formed between the outer periphery of the bearing support tube portion and an inner peripheral edge of the insulator. Therefore, it is possible to prevent the entered water or oil from reaching the circuit board, and determine the positions of the insulator and the stator in the direction of the axis of rotation without any trouble. Moreover, the dam portion that prevents the flow of a liquid entering from outside into a further depth can be formed between the outer periphery of the bearing support tube portion and the inner peripheral edge of the insulator.

Therefore, it is possible to effectively prevent the entry of water or oil. In terms of the operation of the positioning portion or dam portion, the present molded structure may be configured in such a manner as to exert the operation of one or both of them.

In addition, a method for molding a brushless fan motor according to one aspect of the present disclosure (the present molding method) is a method for molding the above brushless fan motor. The present molding method includes at least: preparing a stator assembly including the insulator holding the circuit board and the stator; fitting the stator assembly at a predetermined position on the bearing support tube portion in such a manner as to locate the circuit board inside the board storage portion; enclosing a portion to be molded, the portion including at least the stator assembly, with a mold including a gate for injecting the insulation material for molding; and injecting the insulation material for molding through the gate of the mold and forming the molded portion.

Moreover, in the method for molding, fitting the stator assembly at the predetermined position on the bearing support tube portion may include bringing a step forming a small-diameter portion on an outer peripheral portion of the bearing support tube portion into contact with a flange portion on an inner peripheral side of the insulator and determining a position of the stator assembly.

The present molding method allows determining the position of the stator assembly including the circuit board, the insulator, and the core in the direction of the axis of rotation. Hence, the possibility that the position of the stator assembly including the insulator and the core is displaced during the molding process is low.

In addition, it is possible to provide an excellent molded structure of a brushless fan motor or method for molding the brushless fan motor on the basis of matters described in the claims.

According to one aspect of the present disclosure, it is possible to prevent defects caused by corrosion, erosion, and other electrical breakdown of the circuit board due to the entry of water or oil. Hence, it is possible to obtain a brushless fan motor that can maintain endurance even after an extended period of use and has higher waterproofness and oilproofness than before.

Moreover, in the molding process of the brushless fan motor, it is possible to manufacture the brushless fan motor easily with high accuracy. Therefore, it is possible to obtain a brushless fan motor with excellent performance.

FIG. 1 is a half cross-sectional view of a brushless fan motor according to one embodiment of the present disclosure as viewed in a direction parallel to the central axis. A member indicated by a reference numeral 1 in FIG. 1 is a stator assembly. The stator assembly 1 includes a stator core 2 configured by laminating a plurality of silicon steel sheets. The stator core 2 has a plurality of salient pole portions 2a arranged in a circumferential direction. Each salient pole portion 2a of the stator core 2 is provided with an insulator 32 including a slot configuring a space for winding a stator winding 3. The stator windings 3 being slot windings are wound using such slots to configure the stator. The plurality of salient pole portions 2a functions as stator poles by energizing the stator windings 3. Therefore, a distal end of each salient pole portion 2a is a pole face 2b of the stator pole. A member indicated by a reference numeral 4 is a circuit board fixed to the stator. An electronic component configuring a control circuit is mounted on the circuit board 4. The control circuit is a circuit for controlling current flowing through the stator winding 3 configuring a part of the plurality of stator poles of the stator assembly 1. The control circuit on the circuit board 4, and the stator winding 3 are electrically connected by winding a lead of the stator winding 3 around a terminal pin (pin portion) 5 that is passed through a through-hole 4a in the circuit board 4 and soldered to an electrode on the circuit board 4.

A member indicated by a reference numeral 6 is a rotor assembly, that is, a rotor. The rotor assembly 6 includes a rotor-side case 7. The rotor-side case 7 includes a cup member 8 including a permeable material, and a blade mounting hub 9 fitted to an outer peripheral portion of the cup member 8. The cup member 8 includes a tubular portion 8a and a bottom wall portion 8b that blocks one end of the tubular portion 8a. A plurality of rotor poles 10 including a permanent magnet is fixed to an inner peripheral portion of the tubular portion 8a in such a manner as to be arranged in the circumferential direction. A through-hole 8c where a bushing 11 described below is fitted is formed in the center of the bottom wall portion 8b. The blade mounting hub 9 includes a tubular portion 9a and a bottom wall portion 9b that blocks one end of the tubular portion 9a. A plurality of blades 12 is fixed on an outer peripheral portion of the tubular portion 9a. The bushing 11 is fixed at a center portion of the bottom wall portion 9b. The bushing 11 is used to fix the rotor-side case 7 to the rotary shaft 13.

Naturally, in terms of data of the blade, such as the cross-sectional shape, the angle of attack, and the helix angle, values suitable for the specifications of the brushless fan motor can be freely selected.

A member indicated by a reference numeral 14 is a stator-side case. The stator-side case 14 includes a bearing support tube portion 17, a housing portion 18, a board storage portion 19, and a plurality of webs 20. Two bearings 15 and 16 that support the rotary shaft 13 of the rotor assembly 6 rotatably are housed in the bearing support tube portion 17. The housing portion 18 surrounds the outer periphery of the plurality of blades 12 of the rotor assembly 6. The board storage portion 19 covers an inner and an outer peripheral side of the circuit board 4 excluding a portion on the rotor assembly 6 side, and a side opposite to the rotor assembly 6. The board storage portion 19 forms a storage chamber 38 where the circuit board 4 is housed and placed. The plurality of webs 20 couples the board storage portion 19 and the housing portion 18. The plurality of webs 20 (refer to FIG. 4: not illustrated in FIGS. 1 to 3A to 3C) is placed, spaced apart in the circumferential direction. As in the known technology illustrated in FIG. 4, for example, a lead storage groove 22 is formed in one of the plurality of webs 20. The lead storage groove 22 houses a plurality of leads 21 that extends, connected to the control circuit of the circuit board 4 and guides the plurality of leads 21 toward the housing portion 18. A communicating path 23 that causes the lead storage groove 22 and the board storage portion 19 to communicate with each other is formed between them.

Figure 2:
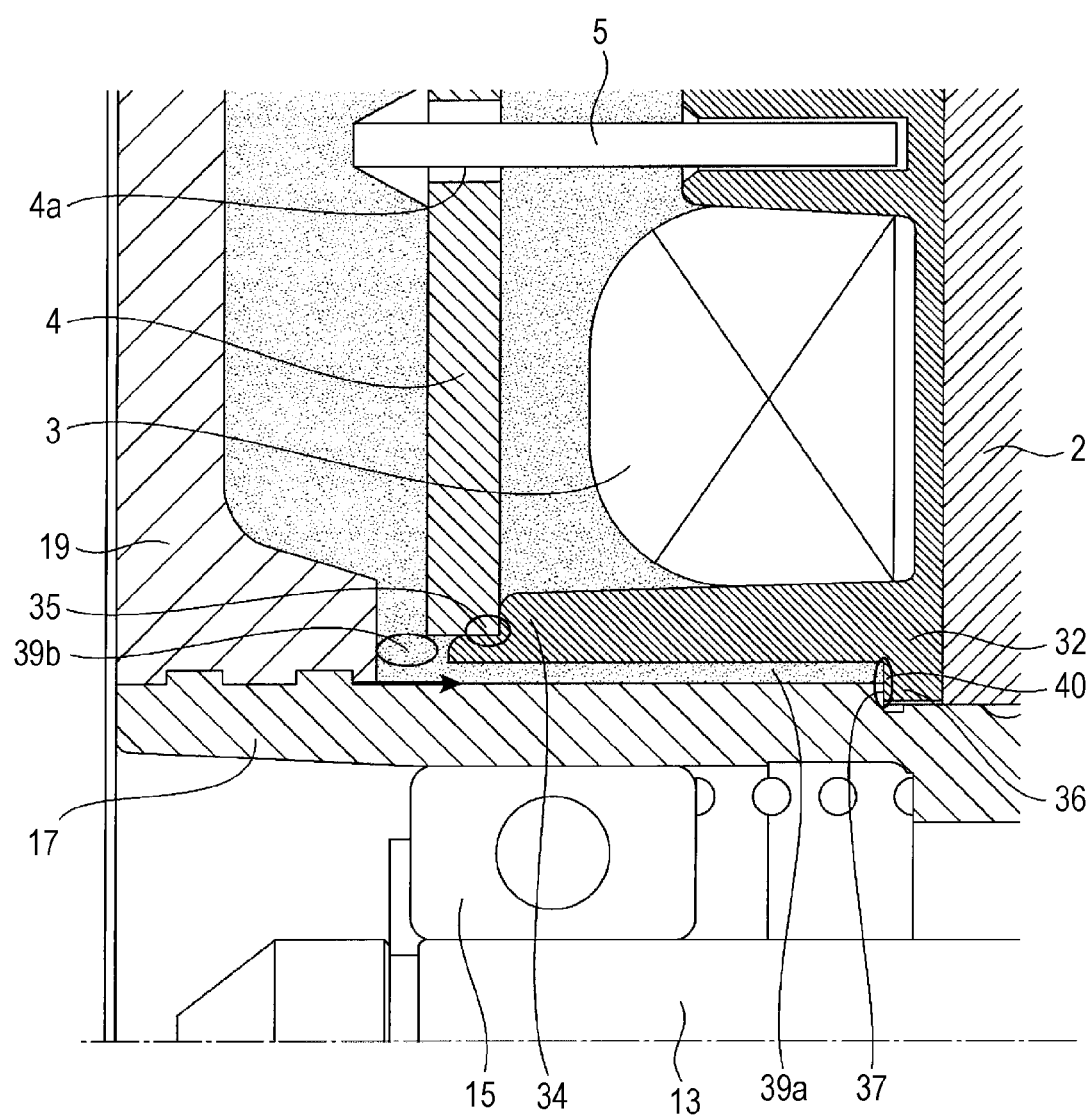
FIG. 2 is an enlarged view of a part where a route of entry of, for example, water or oil is blocked by a molded material in the brushless fan motor illustrated in FIG. 1.

FIG. 2 illustrates an example of a main part of a molded structure of the circuit board 4 in the brushless fan motor according to the embodiment. FIG. 2 is a main part enlarged view of the half cross-sectional view of the brushless fan motor as viewed in the direction parallel to the central axis in FIG. 1. With reference to FIG. 2, the insulator 32 and the board storage portion 19 are placed around the bearing support tube portion 17. A wall portion of the slot (the place where the stator winding 3 is wound) of the insulator 32 on the bearing support tube portion 17 side extends in the axial direction of the rotary shaft 13. A notch portion 35 including a recess or groove is formed in a distal end portion 34 of the wall portion. One end of the circuit board 4 on the bearing support tube portion 17 side is supported by the notch portion 35 including a recess or groove.

The insulator 32 supports the one end of the circuit board 4 on the bearing support tube portion 17 side at the notch portion 35 including a recess or groove formed in the distal end portion 34 of the insulator 32. A gap 39a with a certain thickness is provided between the insulator 32 and the bearing support tube portion 17. An insulation material (a part of the molded portion) configuring the molded portion is disposed in the gap 39a. Moreover, a gap 39b with a certain thickness is also provided between the distal end portion 34 of the insulator 32 that supports the one end of the circuit board 4 and the board storage portion 19. The insulation material (the part of the molded structure) configuring the molded portion is also disposed in the gap 39b.

A flange portion 36 is formed on an inner peripheral side on an inner peripheral portion of a bottom portion (the right-hand side in FIG. 2) of the slot of the insulator 32 located on the bearing support tube portion 17 side, that is, the bottom portion of the slot of the insulator 32, the bottom portion being in contact with the stator core 2, in such a manner as to surround the bearing support tube portion 17. Moreover, a step 37 is formed in such a manner that a small-diameter portion is formed on an outer peripheral portion, which faces the flange portion 36, of the bearing support tube portion 17. In other words, the small-diameter portion is formed via the step 37 on the outer peripheral portion of the bearing support tube portion 17. The flange portion 36 is in contact with the step 37, and fitted on the small-diameter portion. The flange portion 36 of the insulator 32 is in contact with the step 37 of the outer peripheral portion of the bearing support tube portion 17, and accordingly the insulator 32 is prevented from moving along the rotary shaft 13 in a direction opposite to the rotor assembly 6. Hence, the position of not only the insulator 32 but also the entire stator assembly 1 configured integrally with the insulator 32 is fixed in the direction along the rotary shaft 13.

The flange portion 36 is formed in such a manner that the height of the flange portion 36 with respect to a surface on the inner peripheral side of the insulator 32 is greater than the depth of the step 37 of the outer peripheral portion of the bearing support tube portion 17. As a result, the gap 39a is formed in which the insulation material (the part of the molded portion) configuring the molded portion is disposed between the insulator 32 and the bearing support tube portion 17.

The surface where the flange portion 36 of the insulator 32 and the step 37 of the bearing support tube portion 17 are in contact with each other (an abutment surface) is not limited to a specific surface. The abutment surface may be a surface located on a plane orthogonal to the axis of the rotary shaft 13, or a surface located on a plane or curved plane that is not orthogonal to the axis. In some cases, the abutment surface is a surface of a combination of both, and further includes a projection and depression portion that engages with the step 37 and the flange portion 36. In short, it is preferable that the flange portion 36 and the step 37 be in contact with each other to exercise the positioning operation as the positioning portion that prevents the insulator 32 and the stator from moving toward the board storage portion 19, or a damming operation as a dam portion that prevents the passage of a liquid. The abutment structure has no problem with any structure.

In this manner, the circuit board 4 is installed with the intervening thermal insulation material configuring the part of the molded portion. Hence, even if water or oil enters from outside, the water or oil flows along an arrow as illustrated in FIG. 2. Therefore, it is possible to prevent occurrence of, for example, corrosion, erosion, and other electrical breakdown of the circuit board 4 due to contact with water or oil, and a reduction in endurance of the circuit board 4.

Moreover, the insulator 32 is in contact at the flange portion 36 with the step 37 of the outer peripheral portion of the bearing support tube portion 17. Hence, even if water or oil enters into a considerable depth as indicated by the arrow, the abutment portion between the flange portion 36 and the step 37 configures a dam portion 40, and prevents the flow of the water or oil along the arrow. From the points of, for example, surface tension and the viscosity of water or oil, it is predicted that water or oil goes over the dam portion and further reaches the stator core 2 side. In terms of this, if water or oil flows over the dam portion and to a further depth, the bearing support tube portion 17 including a metal such as brass, the stator core 2 including, for example, steel sheets, and the insulator 32 including, for example, a resin are hard to be influenced by water or oil as compared the circuit board 4. Hence, an adverse effect on the main performance of the brushless fan motor hardly occurs.

As described above, the insulator 32 is configured in such a manner that the flange portion 36 is in contact with the step 37 of the outer peripheral portion of the bearing support tube portion 17. Consequently, the insulator 32 has the positioning operation that prevents the movement of the stator assembly 1 configured integrally with the insulator 32. Furthermore, the insulator 32 has the damming operation that prevents the passage of a liquid such as water or oil that enters from outside. Upon implementation, naturally, there is no problem in designing as appropriate in such a manner to give the upper hand to either of the operations according to, for example, a use environment of a brushless fan.

Next, the molding process of the manufacturing process of the above brushless fan motor is described. Any manufacturing process that has conventionally been performed can be employed as the manufacturing process other than the molding process.

The stator assembly 1, the circuit board 4 including the electronic component, and the plurality of leads 21 are integrally molded by one injection of epoxy resin being the insulation material in a state of being housed in the stator-side case 14. A reference numeral 24 is the molded portion formed by this molding process. In this example, the pole face 2b of the stator pole of the stator core 2 is also thinly covered with epoxy resin being the insulation material.

Specifically, the molded portion 24 is formed with an epoxy resin of which hardness after curing is between 30 and 90 Shore D. An epoxy resin of which hardness after curing is lower than 30 Shore D has flexibility after curing but has low thermal resistance and adhesion after curing, and therefore has low reliability. In contrast, an epoxy resin of which hardness after curing is greater than 90 Shore D has high thermal resistance and adhesion after curing but has low flexibility, and therefore may damage the circuit board and the electronic component. However, in recent years, the endurance of a circuit board and an electronic component to heat and stress is also increasing. Hence, naturally, even an epoxy resin of which hardness after curing exceeds 90 Shore D can be used to exploit the above advantages.

In the embodiment, it is also possible to use, for example, ME-372, 91 Shore D, Pelnox, Ltd., or XNR5002G, 90 Shore D, Nagase ChemteX Corporation, as a resin for forming the molded portion 24. Epoxy resins are used for molding resins in many cases. However, a molding material of any kind of resin can be used as the molding material for forming the molded portion 24 as long as it is a molding material that is a thermosetting resin and can exert required performance. The molding material to be used may be, for example, a polyurethane resin or silicone resin. In any case, in the embodiment, the molding material is not especially limited. There is no problem in using any molding material as long as it has required performance in endurance to, for example, heat from the circuit board and the electronic component, hardness after curing, flexibility, thermal resistance, adhesion, and the like, and benefits the object of the embodiment.

A mold for forming the molded portion is produced in such a manner that the epoxy resin being the insulation material flows from the lead storage groove 22, which houses the leads 21, of the web 20 toward the stator. With such a structure, there is an advantage that the number of operations of molding the epoxy resin being the insulation material is one, and the number of man-hours is reduced. Moreover, an interface between two molded portions is not present in the molded portion 24 including the epoxy resin being the insulation material. Hence, it is possible to enhance the waterproof effect. Furthermore, the pole face 2b of the stator pole of the stator is covered with the epoxy resin being the insulation material. Hence, it is possible to prevent water from entering the stator core 2 from the pole face 2b of the stator pole.

Moreover, as described above, the molding material is disposed both between the bearing support tube portion 17 and the insulator 32 and in the storage chamber 38 inside the board storage portion 19. Hence, water or oil that has entered from between the bearing support tube portion 17 and the board storage portion 19 through capillary action is simply absorbed between the molded portion 24 and the bearing support tube portion 17. The possibility of reaching the circuit board 4 is low. Moreover, the water or oil that has entered in such a manner is also generally held back since the flange portion 36 of the insulator 32 is in contact with the step 37 of the outer peripheral portion of the bearing support tube portion 17. Therefore, the possibility that water or oil enters into a further depth is also low.

Figure 3A:
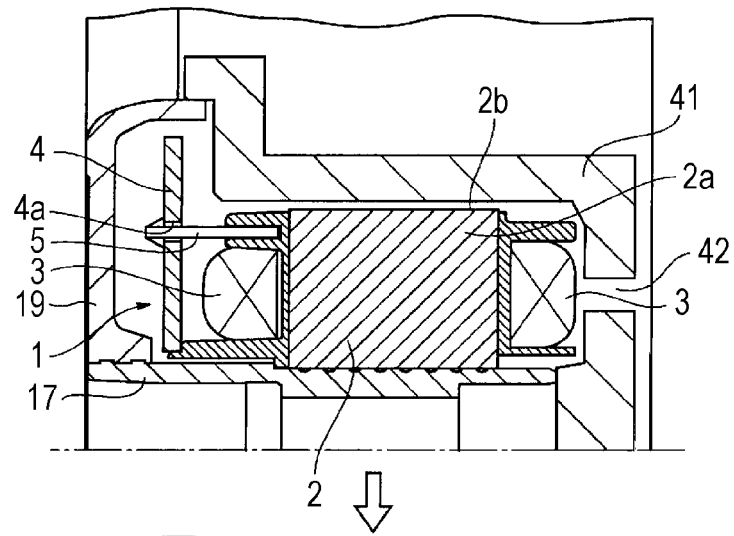
FIGS. 3A to 3C are half cross-sectional views of the brushless fan motor illustrated in FIG. 1 as viewed from the plane parallel to the rotary shaft, the plane passing the center of the rotary shaft, and illustrates the states of the brushless fan motor in each step of the molding process for the brushless fan motor.
Figure 3B:
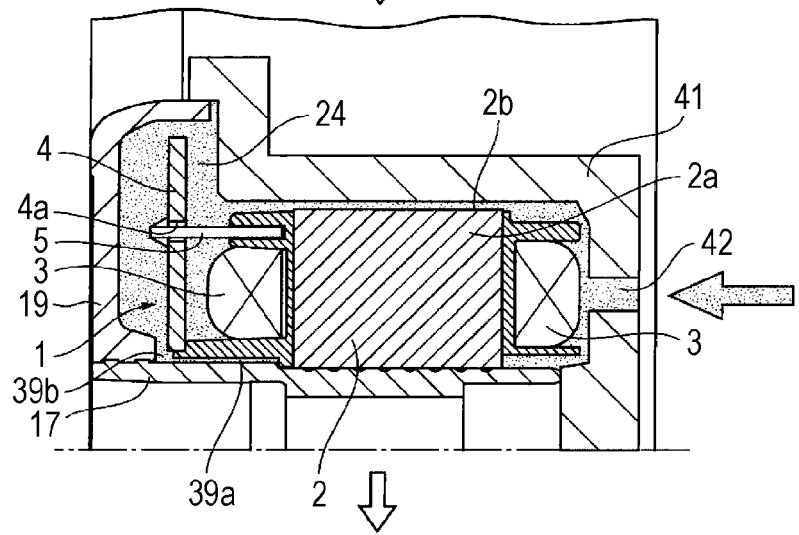
Figure 3C:
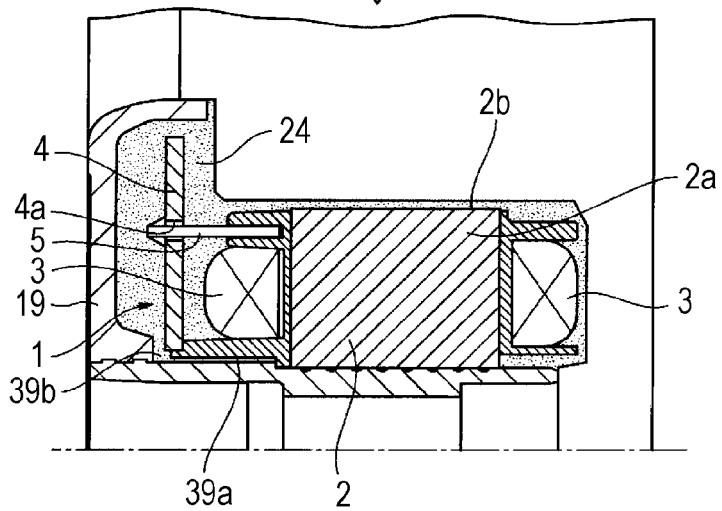

FIGS. 3A to 3C illustrate an example of another molding process in the manufacturing process of the brushless fan motor of the embodiment. Matters that are not especially described are the same as those of the first example of the molding process.

The bearing support tube portion 17 is formed by machining, using a metal such as brass. The step 37 (refer to FIG. 2) having a shape that has a larger diameter than a portion where the stator core 2 is mounted is formed on the circuit board 4 side of the portion where the stator core 2 is mounted, on the outer peripheral portion of the bearing support tube portion 17. The bearing support tube portion 17 is fixed by insert molding to the stator-side case 14 (refer to FIG. 1) that holds and encloses the entire brushless fan motor at a terminal end (front end) of the bearing support tube portion 17 on a side where the web 20 is provided. The stator-side case 14 includes the storage chamber 38 in the middle thereof. The storage chamber 38 has a certain depth around the circuit board 4 attached to the front end of the stator assembly 1 in such a manner as to house the circuit board 4, and be able to be molded.

Moreover, a hollow portion used to be fitted on the bearing support tube portion 17 is formed in the stator having the stator core 2 including, for example, laminated steel sheets, the insulator 32, and the stator windings 3. The wall portion of the insulator 32 on the bearing support tube portion 17 side extends in the axial direction of the rotary shaft 13. The notch portion 35 including a recess or groove is formed in the distal end portion 34 of the wall portion. The notch portion 35 supports the one end of the circuit board 4 on the bearing support tube portion 17 side. A substantially circular blind hole is provided to the circuit board 4 in such a manner that the circuit board 4 is fitted into the notch portion 35 of the insulator 32 arranged side by side in the circumferential direction. The circuit board 4 is temporarily held in the notch portion 35 of the insulator 32 with the substantially circular blind hole. Furthermore, the pin portion 5 is mounted through the through-hole 4a of the circuit board 4. The pin portion 5 is fixed and connected by soldering to the circuit board 4, and electrically joined to the stator windings 3.

The circuit board 4 and the stator assembly 1, which are configured in this manner, are fitted onto the bearing support tube portion 17 mounted on the stator-side case 14. At the time of fitting, the flange portion 36 of the insulator 32 is inserted until coming into contact with the step 37 of the outer peripheral portion of the bearing support tube portion 17. Consequently, the positions of the circuit board 4 and the stator assembly 1 are determined. The circuit board 4 is located at a predetermined position inside the storage chamber 38 of the board storage portion 19 of the stator-side case 14. Consequently, a stator-side assembly that has finished the preparation stage of the molding process is completed.

In the state illustrated in FIG. 3A, the stator-side assembly that has finished the preparation stage of the molding process is surrounded by a cup-shaped molding jig 41 that surrounds a predetermined molded portion.

As illustrated in FIG. 3B, an insulation material for molding is injected into the molding jig 41 through a gate (injection hole) 42 being an injection hole in a bottom portion of the cup-shaped molding jig 41 while maintaining the state illustrated in FIG. 3A. After the insulation material for molding is distributed substantially uniformly up to small spaces, heating or cooling is performed over a certain period of time.

As illustrated in FIG. 3C, after the insulation material is hardened and cured, the molding jig 41 is then removed to finish molding the stator-side assembly.

The insulation material injection hole 42 of the cup-shaped jig 41 is located in the bottom portion of the cup-shaped molding jig 41. The insulation material for molding is injected through the injection hole 42. Accordingly, the insulation material flows from the bottom portion (the side opposite to the board storage portion 19) of the cup-shaped molding jig 41 toward the board storage portion 19 inside the molding jig 41. At this point in time, mainly the stator core 2 and the like hinder the insulation material from flowing. As a result, the stator assembly 1 receives a force toward the board storage portion 19 as viewed in the axial direction of the rotary shaft 13. However, in the stator assembly 1, the flange portion 36 of the insulator 32 comes into contact with the step 37 of the outer peripheral portion of the bearing support tube portion 17 to determine the position. Hence, the possibility that the position of the stator assembly 1 is displaced during the molding process is low.

The place where the molding material is injected is not limited the above one place, the gate. For example, as described above, the molding material being the insulation material may be flown from the lead storage groove 22, which houses the leads 21, of the web 20 toward the stator. In this manner, as long as the positioning operation of the step 37 can be exploited, any molding means can be used.

An unnecessary excess molded portion 43 and the like are then cut off. Furthermore, the rotary shaft 13 of the rotor assembly 6 is then inserted into and fixed to the bearing support tube portion 17 in such a manner as to be pivotally supported by the bearing support tube portion 17 via the bearings 15 and 16. Consequently, the main part of the brushless fan motor is completed.

In the embodiment, with the above molding process of the brushless fan motor, the flange portion 36 of the insulator 32 comes into contact with the step 37 of the outer peripheral portion of the bearing support tube portion 17 to determine the position. Hence, the possibility that the stator assembly 1 is displaced during the molding process is low. Therefore, the manufacture of the brushless fan motor is facilitated, and the accuracy of manufacture can be increased.

If the structure where the pole face 2b is covered with the molded portion is employed as in the above embodiment, when the dimension of the gap between the rotor and the stator is reduced, it is hard to maintain the dimension of the gap within a predetermined range even if the molding accuracy is increased. Hence, in such a case, it is also possible to apply a low viscosity insulating resin (for example, epoxy varnish) having viscosity that can be impregnated into the stator core to the pole faces of the plurality of salient pole portions after the molded portion is formed with epoxy resin as an insulation material in such a manner that the pole faces 2b of the plurality of salient pole portions are exposed. Consequently, the low viscosity insulating resin enters between a plurality of steel sheets configuring the stator core 2, and exerts a waterproof effect. Therefore, as a result, it is possible to reduce the dimension of a gap between the pole face of the stator and the rotor. Therefore, it is possible to effectively prevent the entry or impregnation of water or oil into the stator core.

It can also be said that the embodiment relates to a molded structure that, in a brushless fan motor where a stator side is molded with an insulation material, prevents occurrence of defects such as corrosion, erosion, and other electrical breakdown due to the entry of water or oil such as cutting fluid into a control circuit board of the brushless fan motor, and a method for molding the brushless fan motor.

What is claimed is:

1. A molded structure of a brushless fan motor, comprising:
    a stator including a plurality of stator poles configured by winding a slot winding around a salient pole portion of a core configured by laminating a plurality of steel sheets, the core including a plurality of the salient pole portions, using a slot of an insulator placed around the core;
    a circuit board fixed to the stator, in which an electronic component configuring a control circuit for controlling current flowing through the windings configuring the plurality of stator poles is mounted;
    a rotor including a plurality of rotor poles comprising a permanent magnet on an inner peripheral side, and a plurality of blades on an outer peripheral side;
    a stator-side case including:
        a bearing support tube portion housing a bearing for rotatably supporting a rotary shaft of the rotor;
        a housing portion surrounding an outer periphery of the blades of the rotor;
        a board storage portion configured to form a storage chamber of the circuit board by covering an inner and an outer peripheral side of the circuit board excluding a portion on the rotor side and a side opposite to the rotor; and
        a plurality of webs coupling the board storage portion and the housing portion; and
    a molded portion in which at least the stator and the circuit board including the electronic component are molded with an insulation material, wherein
    the insulator includes a projecting end formed on the board storage portion side of the insulator, the projecting end is positioned on the rotary shaft side of the insulator,
    at least a part of the circuit board is supported by a notch portion in a distal end portion of the projecting end,
    the board storage portion and the insulator are placed in such a manner as to surround a periphery of the bearing support tube portion,
    a part of the molded portion is disposed between the bearing support tube portion and the insulator and between the board storage portion and the insulator, and
    the entire circuit board located inside the storage chamber, excluding the portion supported by the projecting end formed on the board storage portion side of the insulator, is covered with the part of the molded portion,
    a small-diameter portion is formed on an outer peripheral portion of the bearing support tube portion via a step,
    a flange portion in contact with the step, the flange portion being fitted on the small-diameter portion, is formed on an inner peripheral side of the insulator,
    the flange portion is formed in such a manner that a height of the flange portion with respect to a surface on the inner peripheral side of the insulator is greater than a depth of the step, and
    the part of the molded portion is disposed between the bearing support tube portion and the insulator.

2. The molded structure of the brushless fan motor according to claim 1, wherein a surface where the step and the flange portion are in contact with each other is a positioning portion configured to prevent the insulator and the stator from moving toward the board storage portion, or a dam portion configured to prevent passage of a liquid.

3. The molded structure of the brushless fan motor according to claim 2, wherein the surface where the step and the flange portion are in contact with each other includes a surface located on a plane orthogonal to the rotary shaft.

4. The molded structure of the brushless fan motor according to claim 2, wherein the surface where the step and the flange portion are in contact with each other includes a surface located on a plane or curved plane that is not orthogonal to the rotary shaft.

5. The molded structure of the brushless fan motor according to claim 3, wherein the surface where the step and the flange portion are in contact with each other includes a projection and depression portion that engages with the step and the flange portion.

6. The molded structure of the brushless fan motor according to claim 1, wherein the insulation material comprises an epoxy-based resin having a predetermined hardness after curing.

7. The molded structure of the brushless fan motor according to claim 1, wherein
    the stator and the circuit board including the electronic component are molded with the insulation material in a state of being housed in the stator-side case, and
    the insulation material or another insulation material, which has viscosity that is impregnatable into the core, is applied to the pole faces of the plurality of the salient pole portions.

8. The molded structure of the brushless fan motor according to claim 7, wherein the insulation material or the other insulation material, which is applied to the pole faces of the plurality of the salient pole portions, comprises a low viscosity insulating resin.

9. A method for making the molded structure of the brushless fan motor according to claim 1, the method comprising at least:

preparing a stator assembly including the insulator holding the circuit board and the stator;

fitting the stator assembly at a predetermined position on the bearing support tube portion in such a manner as to locate the circuit board inside the board storage portion;

enclosing a portion to be molded, the portion including at least the stator assembly, with a mold including a gate for injecting the insulation material for molding; and injecting the insulation material for molding through the gate of the mold and forming the molded portion.

10. The method according to claim 9, wherein said fitting the stator assembly at the predetermined position on the bearing support tube portion includes bringing a step forming a small-diameter portion on an outer peripheral portion of the bearing support tube portion into contact with a flange portion on an inner peripheral side of the insulator and determining a position of the stator assembly.

11. The method according to claim 10, wherein the mold having the gate on a side opposite to the board storage portion is used as the mold including the gate for injecting the insulation material for molding, and said forming the molded portion includes injecting the insulation material from the side opposite to the board storage portion toward a direction of the board storage portion in an axial direction of the rotary shaft.

12. The method according to claim 11, wherein the insulation material is injected in such a manner that a force that presses the stator assembly toward the storage chamber occurs due to the flow of the injected insulation material.

* * * * *